Patented Dec. 26, 1950

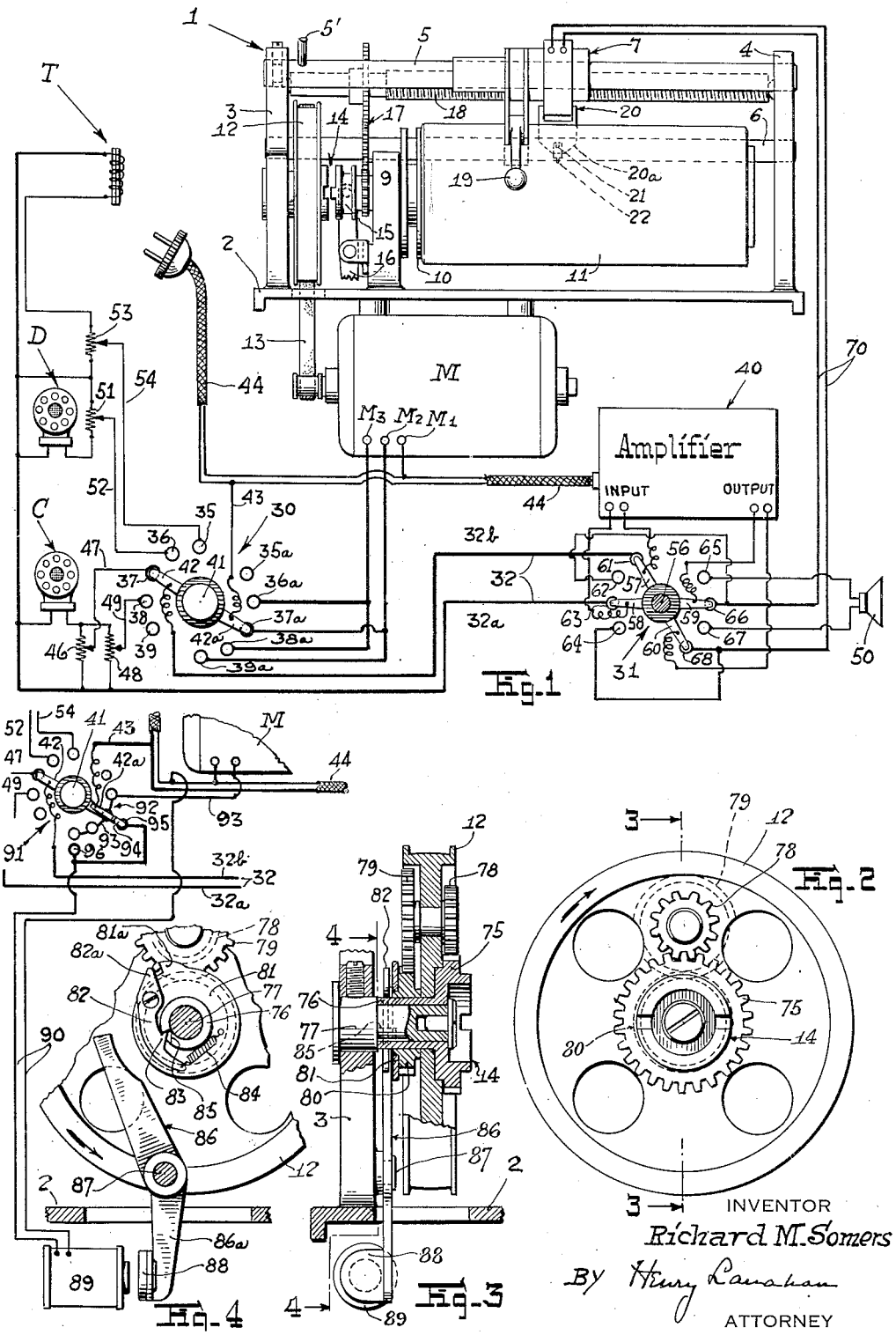

2,535,657

UNITED STATES PATENT OFFICE 2,535,657

SOUND RECORDING SYSTEM

Richard M. Somers, West Orange, N. J., assignor to Thomas A. Edison, Incorporated, West Orange, N. J., a corporation of New Jersey Application December 1, 1945, Serial No. 632,183

7 Claims. (Cl. 179—100.4)

This invention relates to phonographs, and more particularly to phonographs adapted for business use, such as dictating machines and the like.

Dictating machines of the electrical type are suited for recording sounds of different character such as dictation, conference proceedings, telephone conversations, etc. since this type of machine, in contrast with the so-called acoustical type of dictating machine, is adapted to record satisfactorily from low-level sources and to be readily coupled to remote microphones, telephone lines, etc. It is therefore customary to adapt these machines for selectively recording sounds from different sources as mentioned.

In recording the human voice or speech, it is well known that the quality of the recordation depends largely upon the rate of speed at which the record is rotated; that is to say, the speed at which the surface of the record is made to pass by the recording stylus. Usually, this rate of movement of the record past the stylus is computed and expressed in linear inches per second. Thus, in order to obtain a standard, say a minimum standard of quality of recordation, the speed of the record must not fall below a given rate—and to obtain a maximum standard of quality, the speed of the record must be maintained at an appreciably higher rate. In the latter case more of the record surface is passed by the stylus in a given time and the undulations or waves, formed in the record by the vibration of the voice, will not be so crowded. In particular, this higher rate of speed provides for a better separation of those waves which are shallow and short and which represent the high sound frequencies of the voice. The above is particularly emphasized because the difference between these rates of speed can be very considerable and thus have a marked effect upon the duration or length of a record—also because the present invention contemplates the use of means for predetermining the speed of rotation of the record in accordance with the selection of the different sources or channels of sounds which have been mentioned above. Therefore, it is the principal object of my invention to provide speed determining means for a phonograph adapted selectively to record and to reproduce sounds of different sources. Other principal objects are:

The provision of novel means for setting the rate of speed of the record as an incident of selecting the mode of operation of the phonograph;

The provision of means for regulating the speed of a phonograph motor in accord with the manipulations of controls for determining the nature of the recording; and The provision of novel means for controlling a differential gear drive to cause the record of a phonograph to be rotated in accord with certain conditions which have been set in said phonograph.

Other objects may appear from the following description and the appended claims.

In the said description, reference is had to the accompanying drawing, of which:

Fig. 1 is a view of a phonographic instrument embodying my invention;

Fig. 2 is a view showing a differential driving mechanism which may be employed in a modified embodiment of my invention;

Fig. 3 is a sectional view taken on line 3—3 of Fig. 2; and

Fig. 4 is a view of the modified embodiment of my invention which employs the driving mechanism shown in Figs. 2 and 3; a portion of this view being taken along line 4—4 of Fig. 3.

Referring to the embodiment of my invention shown in Fig. 1, there will be seen a conventional type of sound recording and reproducing instrument or phonograph 1. This phonograph comprises a base-plate 2 provided with side standards 3 and 4 adapted to support the cross-rods 5 and 6 upon which are mounted for transverse movement a phonograph carriage 7. The plate 2 is further provided with an intermediate standard 9 adapted to support a mandrel 10 for mounting the cylindrical record 11. The construction of the mandrel 10 is such as to permit the removal of the record therefrom at will. During the operation of the machine, the mandrel and thus the record is adapted to be rotated by an axially aligned pulley 12 connected by a belt 13 to the motor M, which is mounted below the plate 2 in the manner shown. In the illustrative type of machine, the rotation of the record 11 by the motor M is adapted to be controlled by a clutch 14 located between the pulley 12 and the head-portion 15 of the mandrel. The clutch 14 is actuated by an arm 16, operated at the discretion of the user of the machine for giving periods of rest to the record while the motor is kept running.

The transversely movable carriage 7 is supported by the rods 5 and 6 so as to overlie the record 11. A means, which is provided for moving the carriage across the record in proportion to the rotation of the record, comprises a gearing connection 17 between the mandrel shaft 10a and a feed-screw 18. This feed screw is supported in parallel relation with the rods in the side standards 3 and 4. A feed-nut, not necessary here to show, is pivotally mounted in the carriage 7, and is adapted to be engaged with or disengaged from the said feed-screw as an incident to the movement of a control lever 19 provided to condition the electrically operated translating unit 20, which is mounted in the carriage 7 and adapted to engage the record in a manner either to record on or reproduce from said record, in accord with the positions of said lever 19.

In the present drawing, the unit 20 is only generally shown as it forms no part of the present invention. However, the specific construction of said unit may, for example, be as disclosed in the patent to Charles W. Dann, No. 2,320,572, issued June 1, 1943. Such a unit has a pivoted piezoelectric element which, in the present drawing, is diagrammatically indicated at 20a. This element carries a recording stylus 21 and a reproducing stylus 22, and when the control lever 19 is moved to an extreme downward position—as is shown in the present drawing—the recording stylus is placed on the record for operation, and when said lever is moved to an extreme upward position, the reproducing stylus is placed on the record for operation, as is described in the above-mentioned patent.

The phonographic machine described above is adapted for recording sound from a plurality of sources, for example, from the respective microphones C and D, and from the magnetic pick-up device T adapted for instance for coupling to a telephone line. In order to select these sources or channels of sound, there is provided a manually operable, so-called, service switch 30. By the operation of this switch, each of the individual sound channels may be selectively connected to the input of an amplifier associated with the present machine and indicated as at 60. When a channel of sound is thus selected, it is intended that the output of the said amplifier be connected with the unit 20 and that the latter be conditioned for recordation upon the record 11. However, since the said unit is also conditionable for reproduction and since when so conditioned it must be connected to the input of the amplifier, the present machine also comprises an automatic amplifier control switch 31. This automatic switch will be described later.

According to my present invention, the service switch 30 is constructed to provide double selective means. One of these means is operative to select and connect one of the abovementioned sound channels with the circuit 32, and the other of said means is to select a power circuit for the operation of the motor M, whereby said motor may drive the record at a rate of speed desired or in accord with the selected channel of sound to be recorded. For this purpose, the switch 30 is provided with a set of terminals 35, 36, 37, 38 and 39, and with another set of terminals 35a, 36a, 37a, 38a and 39a. The switch has a knob 41 carrying the arms 42 and 42a, respectively associated with the first and the second set of the above terminals, as shown. The arm 42 is connected to a lead 32b of the circuit 32, and the arm 42a is connected by a lead 43 to one side of the power supply cable 44 which extends to supply the amplifier, as shown. The other side of the plug-in cable 44 is connected to a terminal M1 of the motor M. The motor has two other terminals M2 and M3, which, according to the present invention, may be connected in any desired way to the terminals 36a, 37a, 38a and 39a.

In the present showing the terminal M2 is shown connected to the terminals 37a and 39a, and the terminal M3 connected to 36a and 38a. The terminal M2 is connected to the motor so that when power is supplied to the motor by way of this terminal and the terminal M1, the motor will run at a low rate of speed, say, substantially half of its maximum speed, and the terminal M3 is connected so that when power is supplied to the motor by way of this terminal and the terminal M1 the motor will run at its maximum speed. Accordingly, when the arm 42a of the switch is moved to contact with the terminals 37a and 39a, the motor will turn at a low rate of speed, and when said arm is moved to contact with the terminals 36a and 38a, the motor will turn at maximum speed.

As is seen in the drawing, the circuit 32 has one side, or a lead 32a thereof, connected in common with all of the sources of sounds, C, D and T, and said circuit has its other side or lead 32b thereof connected to the arm 42 of the switch 30. Accordingly, when this arm is moved in contact with one of its associated terminals, one of the said sources of sounds will be selected and connected to the said circuit 32. In the present instance, I have shown the microphone C connected in two ways; through a volume control 46 and lead 47 to the terminal 37, and through another volume control 48 and lead 49 to the terminal 38. The microphone D is shown connected, through the volume control 51 and lead 52 with the contact 36, and the pick-up T connected, through a volume control 53 and lead 54, to the contact 35.

It is to be made clear here, that the two different connections of the microphone C are not made directly to select different rates of speed for recordation, but that these connections are made so as to select one or the other of the volume controls or resistances 46 and 48 whereby to use said microphone for different purposes. For instance, when it is selected by the way of volume control 46 and lead 47 it is for use to pick up sound spoken at a distance therefrom and thus to adapt the same for conference recordation, and when selected by the way of the volume control 48 and lead 49 it is for use at close range, such as for low tone recordation. Accordingly, the rates of speed are selected as an incident of the adaptation of said microphone for different uses.

The microphone D is selected only for dictation, and its lead 52 is connected to the switch contact 36 so that when it is selected by the arm 42 the other arm 42a will make contact with 38a to cause the motor to operate in a manner to rotate the record at a high rate of speed for maximum quality of recordation. The selection of the pick-up device T, which is connected as explained with the contact 35, causes the arm 42a to contact terminal 39a and thus make connection with the motor at the terminal M2, causing the motor to rotate the record at a low rate of speed. This combination is particularly desirable because sound that is induced into the device T has usually lost all of its high frequency characteristics, and nothing would be gained by letting the record rotate at its former high rate of speed. The invention is thus highly advantageous in this respect, as it conserves the surface of the record and makes the latter last longer.

While I have chosen to show my invention embodied in a phonographic machine using a cylindrical record medium, it is to be understood that the invention is equally applicable to other types of machines wherein the record mediums are of diverse forms. For instance, the invention may be incorporated in a machine using a disc record, or in a phonographic device using a wire or tape which is moved or driven past a recording head, as is known in the art.

The aforementioned switch 31 has a central shaft 56 adapted to be rocked by the movement of the control lever 19 through the medium of the rod 5 and a radially extending pin 5' thereof. The rod 5 is rocked by the lever in the manner explained in the Dann patent referred to above, and the connection of the pin 5' to cause the shaft 56 to rock may be made by any mechanical means not necessary to show here. Secured to the shaft 56 is a plate of insulating material carrying four individually insulated arms 57, 58, 59 and 60. The arms 57 and 58 have respective leads connected with the input of the amplifier 40, and the arms 59 and 60 have respective leads connected to the output of said amplifier, as shown in the drawing. The switch has the terminals 61, 62, 63 and 64 in association with the arms 57 and 58, and the terminals 65, 66, 67 and 68 in association with the arms 59 and 60. When the switch is turned to the position shown—which is that of recording by virtue of the above stated position of the lever 19—the aforementioned circuit 32 is connected through the terminals 61 and 63, and arms 57 and 58, to the input of the amplifier. In this position of the switch the pair of arms 59 and 60 serve to connect the output of the amplifier to a circuit 70 leading to the unit 20. However, when the switch is turned counterclockwise in response to a movement of the lever 19 into a position for reproduction, the arms 57 and 58 are brought in contact with the terminals 62 and 64, and the other arms 59 and 60 in contact with the terminals 65 and 67. This will disconnect the circuit 32 from the input of the amplifier and connect the circuit 70 of the unit 20 to the said input. In a similar manner, the arms 59 and 60 will disconnect the circuit 70 from the output of the amplifier and connect the speaker 50 to the said output. During reproduction, the knob 41 of the service switch 30 is left in the position which it occupied during recordation. When the machine is not in use the knob 41 is turned in a manner to cause the arms 42 and 42a to contact respectively with the terminals 39 and 35a, which latter have no connection with the wiring system and thus provide an off-position for the switch.

In Figs. 2, 3 and 4, there is shown a modified form of my invention. In this form the rate of speed of the record is determined by means of a differential mechanism which includes an epicyclic train of gears which is built in the driving pulley 12, as best seen in Figs. 2 and 3. The arrangement comprises a central gear 75 having a long sleeve 76 journaled upon a stud shaft 77 adapted for the support of the pulley 12. The face of the gear 75 is extended and slotted as shown, to form the driving portion of the clutch 14. The pulley 12 is free to turn on the sleeve 76, and it carries a pair of gears 78 and 79 which are axially secured together as shown and which are adapted respectively to mesh with the gear 75 and a gear 80 mounted on the sleeve 76 at the left side of the pulley, as seen in Fig. 3. The gear 80 has a smaller pitch diameter than the gear 75, and thus the gear 79 must, of necessity, have a larger diameter than its companion gear 78 in order properly to mesh with the gear 80. In proportion, the gear 78 is substantially half the size of gear 75 and gear 79 substantially of the same size as the gear 80. Secured to the gear 80 is a disc 81 carrying a pivoted pawl 82 having a tooth 83 urged, by a spring 84, to enter a notch 85 made in the sleeve 76. The pawl 82 has a tail 82a, and the disc 81 has a projection 81a, both adapted to cooperate with the upper end of a stop lever 86 so as to block the movement of the gear 80, or to prevent it from rotating in unison with the gear 75 when the pulley 12 is turned. The stop lever 86 is pivoted at 87 on the standard 3, and its lower end 86a has an armature 88 adapted to be attracted by an electromagnet 89 connected in a circuit 90 controlled by a selective switch 91, substantially of the construction of the service switch 30.

Referring to Fig. 4, it will be seen that the switch 91 has an arm, such as the previous arm 42, adapted to contact the terminals connected with the leads 47, 49, 52 and 54 associated with the previously described sources of sounds. The switch 91 also has an arm 42a adapted to make contact with a group of terminals, the equivalent of the terminals 35a, 36a, 37a, 38a and 39a but, for simplicity of illustration, indicated generally by the numeral 92. In this embodiment, all of the active terminals 92 are connected together by a wire 93 which leads to the motor M, to cause operation of the same by the way of the arm 42a, lead 43 and the other side of the cable 44 which is connected to said motor as shown. The arm 42a for the present switch has an extension 94 adapted to carry the current of lead 43 to a pair of auxiliary contacts 95 and 96, which, as seen, are connected in the circuit 90 of the electromagnet 89 and which are located in direct alignment with the terminals connected with the leads 47 and 54 used, respectively, to select the microphone C for conference recordation, and the magnetic pick-up T for the recordation of telephone conversations. Accordingly, when the service switch 91 is moved to select these sources of sounds, the circuit 90 will be closed to cause energization of the electromagnet 89. This will cause the upper end of the lever 86 to move in the path of the tail of the pawl 82, and also in the path of the projection 81a, whereupon the gear 80 will be stopped from turning with the gear 75 as the tooth 83 of the pawl will be withdrawn from the notch 85 of the sleeve 76. When this occurs, the epicyclic train of gears will operate to cause the gear 75 to turn in the same direction as the pulley 12, but at a substantially reduced rate of speed, which, in accord with the proportions given above, is approximately half of the rate of speed this gear is made to rotate by the pulley 12 when the gear 80 is not stopped by the lever 86.

Having thus described my invention, I claim:

1. In a phonograph having record-cooperable sound-recording means and a record medium movable relative to said recording means: the combination of speed-regulable driving means for said record medium operable at slow and relatively fast speeds; a plurality of channels with sounds to be recorded selectively, said channels being operatively connectable to said sound-recording means; means operable to selectively so connect said sound channels; and means connected to said driving means and controlled by said selecting means for regulating said driving means to operate at slow and fast speeds according to which of said sound channels is connected to said sound-recording means.

2. In a phonograph including sound recording means and cooperable record means, in combination: an adjustable drive for moving one of said means relative to the other means at different speeds; a plurality of representing sources of electric oscillations selectively connectable with said recording means; a device operative to select and so connect any one of said sources, and means, operatively coupled to said device and rendered effective as said device is operated to selectively connect said sources, for adjusting the said drive to cause the same to move said one means at different respective speeds.

3. In a phonographic machine for selectively recording speech transmitted on a telephone line and speech transmitted from a microphone: the combination of a movable support for a record, a record-cooperable translating device, electric transmission circuits coupled to said telephone line and microphone respectively, circuit means including an electric switch for selectively coupling said transmission circuits to feed speech signals to said recording device, a drive for moving said record support relative to said recording device, said drive including control means movable into first and second positions to produce said movement at slow and relatively fast speeds respectively, a common control member for said transmission circuits and said drive, and respective connections between said control member and said switch and between said control member and said drive control means for placing said drive control means in said first position to cause the record support to be moved at a slow speed when said recording device is coupled by said switch to said telephone line and for placing said drive control means in said second position to cause the record support to be moved at a fast speed when the recording device is coupled by said switch to said microphone.

4. In a phonographic machine for recording from sources having relatively lower and higher frequency components respectively: the combination of a movable support for a record, a record-cooperable recording device of the electrical type, first and second transmission lines connected to said sources of lower and higher frequency components respectively for feeding oscillations to said recording device for recordation on said record, a first electric switch for coupling said recording device to said transmission lines respectively, a drive for moving said record support at different selected speeds, means operatively connected to said drive and including a second electric switch operable to control the speed of said record support, and means connecting said second electric switch to said first switch for operating one with the other in a predetermined relationship to cause said support to be driven at a lower speed when said recording device is connected to said first transmission line and to cause said support to be driven at a higher speed when said recording device is connected to said second transmission line.

5. In a phonograph recording system including two sources of sound-representing electrical oscillations: the combination of a movable support for a record; a record-cooperating recording device; a variable-speed driving means operable to produce movement between said record and recording device at different selected speeds; a plurality of electric input circuits for said system operatively coupled to said sources respectively; switching means operable to connect said recording device to said input circuits selectively; and means controlling the effective speed of said driving means and coupled to said switching means for causing said driving means to operate at different preselected speeds according to which of said input circuits is connected by said switching means to said recording device.

6. The combination set forth in claim 5, wherein one of said sources has oscillation components of higher frequency than has the other, and wherein said last-stated means is adapted to cause said driving means to operate at a faster speed when said switching means is positioned to connect said one source to said recording device and to operate at a relatively slower speed when the switching means is positioned to connect said other source to said device.

7. In a phonographic system: the combination of a support for a phonographic record; a record-cooperable recording device mounted for relative traveling movement; an electric motor for producing said relative traveling movement, said motor having circuits selectively connectable to cause it to operate at different speeds; a plurality of electrical input circuits for carrying sound-representing electric oscillations for recordation on said phonographic record by said recording device; and a unitary switch device having one section connected to said motor circuits and another section connected to said input circuits and effective at different positions thereof to connect selected ones of said input circuits to said recording device and concurrently to cause said motor to operate at different selected speeds.

RICHARD M. SOMERS.

REFERENCES CITED

The following references are of record in the file of this patent:

UNITED STATES PATENTS

| Number | Name | Date |
|---|---|---|
| 2,113,401 | Goldsmith | Apr. 5, 1938 |
| 2,181,513 | Kurtze | Nov. 28, 1939 |
| 2,401,889 | Smith | June 11, 1946 |